(12) United States Patent
Wu et al.

(10) Patent No.: US 11,599,803 B2
(45) Date of Patent: Mar. 7, 2023

(54) SOLDERING PROCESS PARAMETER SUGGESTION METHOD AND SYSTEM THEREOF

(71) Applicant: DELTA ELECTRONICS, INC., Taoyuan (TW)

(72) Inventors: Shu-Han Wu, Taoyuan (TW); Hung-Wen Chen, Taoyuan (TW); Ren-Feng Ding, Taoyuan (TW); Yi-Jiun Shen, Taoyuan (TW); Yu-Cheng Su, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 731 days.

(21) Appl. No.: 16/355,867

(22) Filed: Mar. 18, 2019

(65) Prior Publication Data
US 2020/0082278 A1 Mar. 12, 2020

(30) Foreign Application Priority Data
Sep. 12, 2018 (CN) .......................... 201811063140.8

(51) Int. Cl.
*G06N 5/04* (2006.01)
*G06N 20/00* (2019.01)
(Continued)

(52) U.S. Cl.
CPC ............... *G06N 5/04* (2013.01); *G06N 20/00* (2019.01); *G06N 3/08* (2013.01); *G06N 20/10* (2019.01); *G06N 20/20* (2019.01)

(58) Field of Classification Search
CPC .......... G06N 5/04; G06N 20/00; G06N 20/20; G06N 20/10; G06N 3/08
See application file for complete search history.

(56) References Cited

U.S. PATENT DOCUMENTS

| 6,587,580 B1 | 7/2003 | Nikmanesh |
| 8,115,138 B2 | 2/2012 | Jacovetty et al. |
| (Continued) | | |

FOREIGN PATENT DOCUMENTS

| CN | 101915769 A | 12/2010 |
| CN | 102006731 B | 7/2012 |
| (Continued) | | |

OTHER PUBLICATIONS

Of D'Emilia et al. A proposal of uncertainty assessment for data of environmental testing: Using a machine learning procedure. In 2018 IEEE International Instrumentation and Measurement Technology Conference (I2MTC) May 2018.*
(Continued)

*Primary Examiner* — Michael J Huntley
*Assistant Examiner* — Adam C Standke
(74) *Attorney, Agent, or Firm* — CKC & Partners Co., LLC (57) ABSTRACT

A soldering process method includes steps of: establishing a material component database; establishing a working parameter database; analyzing material and component characteristics required for a new soldering process; comparing the characteristics with information in the material component database; selecting operating parameters corresponding to the material and component characteristics similar to those required for the new soldering process; performing the soldering process using the operating parameters corresponding to the material and component characteristics similar to those required for the new soldering process; measuring and recording the soldering process execution information and the final product information; determining whether the final product of the solder process meets the quality control requirements; using the machine learning method to fit the soldering process execution information
(Continued)

and the final product information of the solder process to get the operating parameters for the next soldering process when the final product does not meet the quality control requirements.

17 Claims, 4 Drawing Sheets (51) Int. Cl.
*G06N 20/20* (2019.01)
*G06N 20/10* (2019.01)
*G06N 3/08* (2006.01)

(56) References Cited

U.S. PATENT DOCUMENTS

| | | | | |
|---|---|---|---|---|
| 2004/0244613 | A1* | 12/2004 | Barajas | H05K 3/1233 |
| | | | | 101/130 |
| 2017/0032281 | A1 | 2/2017 | Hsu | |
| 2018/0200819 | A1* | 7/2018 | Teraoka | B23K 3/03 |

FOREIGN PATENT DOCUMENTS

| | | | | |
|---|---|---|---|---|
| CN | 104889520 A | | 9/2015 | |
| CN | 107414233 A | | 12/2017 | |
| CN | 108615075 A | * | 10/2018 | G06F 30/20 |
| JP | 2002-366613 A | | 12/2002 | |
| TW | 453145 B | | 9/2001 | |
| TW | 200308070 A | | 12/2003 | |
| TW | 201415971 A | | 4/2014 | |
| WO | 0035622 A1 | | 6/2000 | |
| WO | 2018/139571 A1 | | 8/2018 | |

OTHER PUBLICATIONS

Martinek P, Krammer et al., Predicting component self-alignment by machine learning technique. In 2018 41st International Spring Seminar on Electronics Technology (ISSE) (Year: 2018).*
D'Emilia et al. A proposal of uncertainty assessment for data of environmental testing: Using a machine learning procedure. In 2018 IEEE International Instrumentation and Measurement Technology Conference (I2MTC) May 2018.*
Wong et al. Surface Defect Detection using Novel Histogram Distance-based Multiple Template Anomalies Detection Algorithm. International Journal of Engineering & Technology. Jan. 7, 2018.*
Zhang et al. "Study of flip chip solder joint cracks under temperature cycling using a laser ultrasound inspection system." IEEE Transactions on Components and Packaging Technologies 32.1 (Year: 2009).*
Rong Youmin et al: "Integrated optimization model of laser brazing by extreme learning machine and genetic algorithm" The International Journal of Advanced Manufacturing Technology, Springer, vol. 87 No. 9, Apr. 8, 2016 (Apr. 8, 2016),pp. 2943-2950, XP036104622, ISSN : 0268-3768, DOI:10.1007/S00170-016-8649-6 [retrieved on Apr. 8, 2016].
Dong Hang et al: "Real time welding parameter prediction for desired character performance" 2017 IEEE International Conference on Robotics and Automation (ICRA), IEEE, May 29, 2017 (May 29, 2017), pp. 1794-1799,XP033126953, DOI:10.1109/ICRA. 2017.7989211 [retrieved on Jul. 21, 2017].

* cited by examiner

SOLDERING PROCESS PARAMETER SUGGESTION METHOD AND SYSTEM THEREOF

RELATED APPLICATIONS

This application claims priority to China Application Serial Number 201811063140.8, filed Sep. 12, 2018, which is herein incorporated by reference in its entirety.

BACKGROUND

Field of Invention

The present disclosure relates to a soldering process parameter suggestion method and the system thereof, and more particularly to a parameters suggestion method and the system utilizing machine learning.

Description of Related Art

Soldering process parameters are extremely important in the soldering process, and optimal parameters are obtained by considering product yield, production stability, production efficiency, production energy consumption, etc. Conventionally, how to quickly find the operating parameters of new products, adjust the operating parameters of modified products, and continuously optimize the soldering parameters during on-line production operation heavily rely upon the expert masters who have deep experience in soldering, and spending a considerable amount of time to repeat test verification is not only labor-intensive, cost-intensive, but also impossible to predict the time required to obtain optimal parameters, and also limit the development of production line automation and flexible production.

Solder joint operations are associated with complex parameter conditions, thereby resulting in different optimum conditions for each solder joint. In the conventional process method, in order to find the soldering parameters, the most used method is "trials and errors". The soldering parameters are thus determined through multiple test accumulations, but it is limited by the overall batches for determining parameters such that it takes a lot of time to verify the parameters, but the best quality may not still be realized in production.

SUMMARY

In one or more embodiments, a soldering process parameter suggestion method includes steps of: establishing a material component database; establishing a working parameter database; analyzing material and component characteristics required for a new soldering process, and comparing the characteristics with information in the material component database; selecting the operating parameters corresponding to the material and component characteristics most similar to those required for the new soldering process; performing the soldering process using the operating parameters corresponding to the material and component characteristics most similar to those required for the new soldering process; measuring and recording the soldering process execution information and the final product information; determining whether the final product of the solder process meets the quality control requirements; and using the machine learning method to fit the soldering process execution information and the final product information of the solder process to get the operating parameters for the next soldering process when the final product does not meet the quality control requirements.

In one or more embodiments, the soldering process method further includes a step of assigning operating parameters contained in the soldering process execution information as optimal operating parameters when the final product of the solder process meets the quality control requirements.

In one or more embodiments, repeatedly using the machine learning method to fit the soldering process execution information and the final product information of the solder process to get the operating parameters for a next soldering process when the final product of the solder process does not meet the quality control requirements.

In one or more embodiments, the material component database includes information on thermal properties, optical properties, and structural dimensions of solder process related materials and components.

In one or more embodiments, the working parameter database includes temperature parameters, laser spot parameters, and heating time parameters.

In one or more embodiments, the soldering process execution information includes solder temperature profiles, dynamic process images of solder feeding, and dynamic process images of solder heating.

In one or more embodiments, the machine learning method includes a step of using at least one or any combinations of decision tree algorithms, support vector machine algorithms, artificial neural network algorithms, and Bayesian algorithms to serve as dimensionality reduction algorithms.

In one or more embodiments, the machine learning method further includes a step of using at least one or a combination of distance-based clustering and density-based clustering to perform cluster grouping.

In one or more embodiments, the distance-based clustering includes at least one or any combinations of K-means clustering, hierarchical clustering and Gaussian mixture model.

In one or more embodiments, the density-based clustering includes at least one or a combination of density-based spatial clustering of applications with noise and level set tree clustering.

In one or more embodiments, the machine learning method further includes a step of using at least one or a combination of a regression algorithm and a classification algorithm to establish a core of conditional probability calculations.

In one or more embodiments, the regression algorithm includes at least one or any combinations of generalized linear model algorithms, support vector machine algorithms, decision tree algorithms, random forest algorithms, gradient boosting machine algorithms, and neural network algorithms.

In one or more embodiments, the classification algorithm includes at least one or any combinations of generalized linear model algorithms, support vector machine algorithms, decision tree algorithms, random forest algorithms, gradient boosting machine algorithms, and neural network algorithms.

In one or more embodiments, a soldering process parameters suggesting system includes a material component database configured to collect solder process related material and component characteristics; a working parameter database configured to collect operating parameters corresponding to the material and component characteristics in the material component database; a computing device configured to analyze material and component characteristics required for a new soldering process, and compare the material and component characteristics with information in the material component database; and select operating parameters corresponding to the material and component characteristics most similar to those required for the new soldering process; a soldering machine configured to perform a soldering process using the operating parameters corresponding to the material and component characteristics most similar to those required for the new soldering process; and a detecting device configured to measure and record soldering process execution information and final product information of the soldering process. The computing device is further configured to determine whether a final product of the solder process meets quality control requirements; and use a machine learning method to fit the soldering process execution information and the final product information of the solder process to get operating parameters for a next soldering process when the final product of the solder process does not meet the quality control requirements.

In one or more embodiments, the material component database includes information on thermal properties, optical properties, and structural dimensions of solder process related materials and components.

In one or more embodiments, the working parameter database includes temperature parameters, laser spot parameters, and heating time parameters.

In one or more embodiments, the soldering process execution information includes solder temperature profiles, dynamic process images of solder feeding, and dynamic process images of solder heating.

In one or more embodiments, the machine learning method is at least one or any combinations of decision tree algorithms, support vector machine algorithms, artificial neural network algorithms, and Bayesian algorithms to serve as dimensionality reduction algorithms.

In sum, the soldering process parameter suggesting method disclosed herein can be applied to a soldering production line with or without a complete database system as well as a production line for manufacturing large number of less varieties or small numbers of more varieties such that all kinds of soldering production lines can be improved effectively to achieve the automatic production.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

The present invention proposes an intelligent soldering process parameters suggesting method, which utilizes machine learning methods to analyze solder joint background parameters, including printed circuit board material properties, circuit design, component characteristics, tin properties, tin supply conditions, and solder joint dynamic generating temperature profiles, heating method and parameters, machine vision images, etc. so as to obtain the best recommended operating parameters, thereby effectively reducing the number of testing or verifying the operating parameters, and thus achieving soldering automation.

Figure 1:
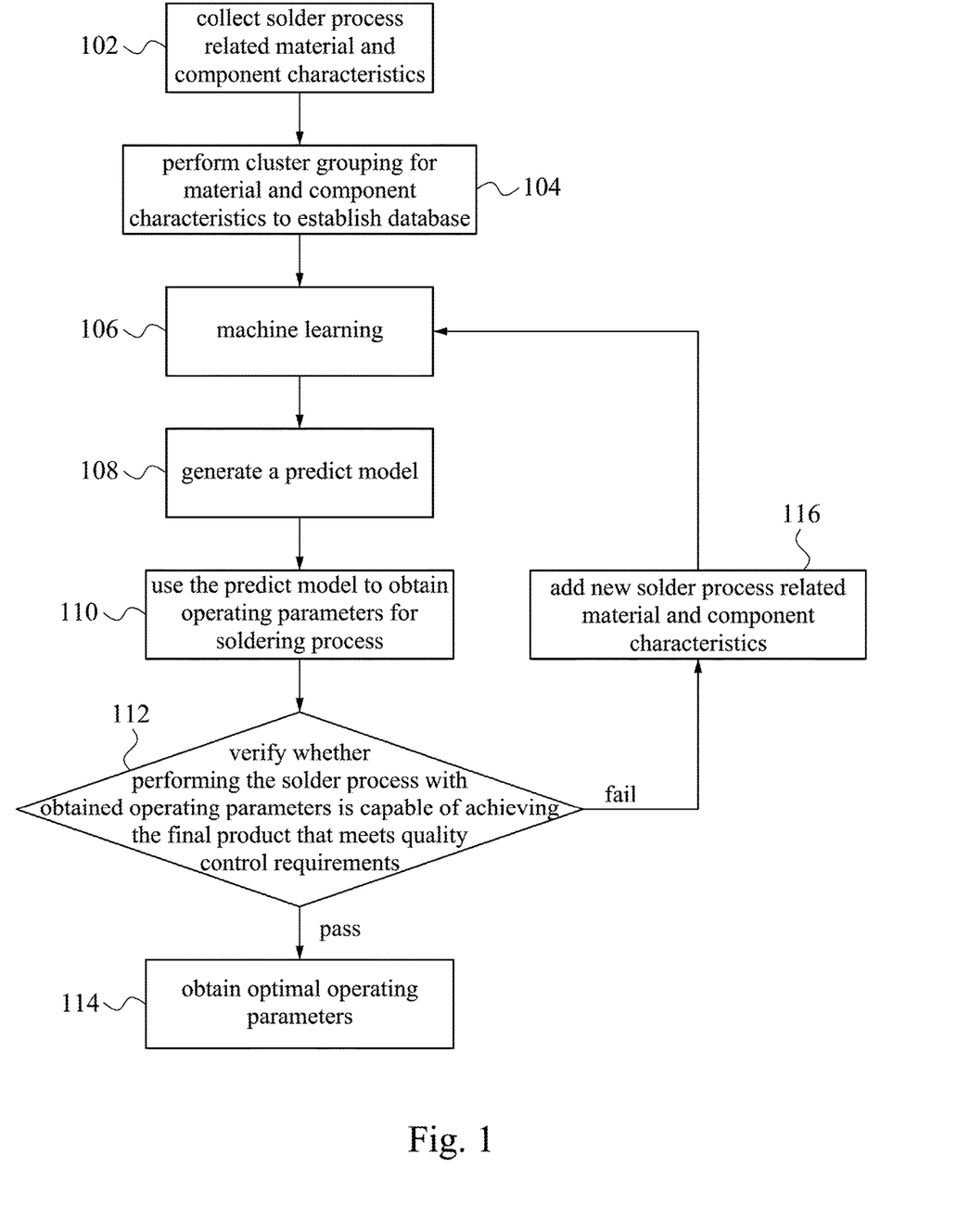
FIG. 1 illustrates a soldering process parameters suggesting method according to one embodiment of the present disclosure.

FIG. 1 illustrates a soldering process parameters suggesting method according to one embodiment of the present disclosure. A step 102 of the method is configured to collect information about the characteristics of soldering processes that can be used in machine learning.

In step 104, the solder process related characteristics information collected in step 102 is grouped into appropriate categories to facilitate building a database and performing machine learning. In the embodiment of the present invention, the solder process related feature information collected in step 102 can be grouped into four categories. The first category includes solder related material and component characteristics, such as thermal characteristics (specific heat, heat transfer, etc.) of printed circuit boards, pads, and tin materials, optical characteristics (reflectance, etc.), and three-dimensional spatial distribution of pins of electronic components to facilitate building a material component database. The second category includes soldering operating information, such as reference temperatures setting, laser spot sizes and powers, heating times, etc., to facilitate building a working parameter database. The operating parameters in the working parameter database should correspond to or be associated with the material and component characteristics in the material component database. The third category includes soldering process execution information, such as solder temperature profiles, dynamic process images of solder feeding, and dynamic process images of solder heating, to facilitate building a soldering process information database. The fourth category includes solder quality result, i.e., the information of the final product of the soldering process, such as the solder structure inspection result of the final product, including the results of ICT test (In-Circuit-Test, ICT test), X-ray (X-RAY) test, AOI inspection (Automated Optical Inspection) or solder cross section inspection, to facilitate building a final product information database.

In steps 106 and 108, a machine learning method is used to establish relationships between the third and fourth categories, i.e., the soldering process execution information and the solder quality results, based on the soldering process information database and the final product information database, i.e., a quality prediction model may be generated. There are various machine learning methods that can be applied to establish the quality prediction model.

In some embodiments, various machine learning models, such as deep learning, random forest, support vector machine, etc., can be combined to integrate the temperature profiles and solder image information to establish relationships between soldering process execution information and solder quality results.

In some embodiments, various machine learning models can be used to establish relationships between the soldering process temperature profiles and the solder quality results.

For example, the soldering process temperature profiles may include a time sequence of the soldering process that may be divided into several intervals, and the feature values (such as average values, standard deviations, areas, etc.) are measured in each interval. For example, the time sequence of the soldering process may include a temperature profile of solder feeding stage, a temperature profile of solder wetting stage, and a temperature profile of solder curing transition stage, and the machine learning is used to establish relationships between the temperature profiles in various stages and the solder quality results.

In some embodiments, the solder quality results may include a final product of the solder process that meets the quality control requirements, or does not meet the quality control requirements, i.e., a disqualified condition which is inconsistent with the quality control requirements. The disqualified conditions may include a state of tin explosion, empty solder (solder skipping), cold welding or no solder of the solder structure, but not limited thereto. Utilizing the machine learning to establish relationships between the temperature profile of each stage and the disqualified condition is still helpful for improving an automatic soldering process.

In some embodiments, the machine learning method may include at least one or any combinations of decision tree algorithms, support vector machine algorithms, artificial neural network algorithms, and Bayesian algorithms to perform dimensionality reduction analysis for information of the aforementioned third and fourth categories so as to establish relationships between the soldering process execution information and the solder quality result, but not being limited thereto.

In some embodiments, the machine learning method may include at least one or a combination of distance-based clustering and density-based clustering to perform cluster grouping. The distance-based clustering may include at least one or any combinations of K-means clustering, hierarchical clustering and Gaussian mixture model, but not being limited thereto. The density-based clustering may include at least one or a combination of density-based spatial clustering of applications with noise and level set tree clustering to facilitate grouping cases with similar characteristics or features, but not being limited thereto.

In some embodiments, the machine learning method may include at least one or a combination of a regression algorithm and a classification algorithm to establish a core of conditional probability calculations to facilitate building relationships between the soldering process execution information and the solder quality results. The regression algorithm may include at least one or any combinations of generalized linear model algorithms, support vector machine algorithms, decision tree algorithms, random forest algorithms, gradient boosting machine algorithms, and neural network algorithms, but not being limited thereto. The classification algorithm may include at least one or any combinations of generalized linear model algorithms, support vector machine algorithms, decision tree algorithms, random forest algorithms, gradient boosting machine algorithms, and neural network algorithms.

In step 110, a prediction model established by the machine learning described above is used to generate the operating parameters of the soldering process, and the soldering process is then performed using the generated operating parameters.

In step 112, verifying whether the operating parameters of the solder process are capable of obtaining a final product that meets the quality control requirements. The verifying may include measuring and recording soldering process execution information and final product information of the soldering process. The method for testing or verifying the final product of the solder structure may be aforementioned ICT test, X-ray test, AOI test or solder structure micro-section inspection, etc. It should be noted that X-RAY test, AOI test, and solder structure micro-section inspection are image-inspection test, but the ICT tests are electrical tests to determine whether the solder structure is short-circuited, broken circuit or open circuit.

In step 114, when the final product meets the quality control requirements, operating parameters contained in the soldering process execution information are assigned as optimal operating parameters.

In most situations, it is difficult to obtain optimal operating parameters by using a first prediction model established by the machine learning method. Therefore, in step 116, the soldering process related material and component characteristics need to be added, and steps 106, 108, 110, and 112 are performed repeatedly until the final product of the soldering process meets or passes the quality control requirements. In some embodiments, the new soldering process related material and component characteristics added in step 116 may be soldering process execution information and solder quality results after performing step 110. In some embodiments, the new soldering process related material and component characteristics added in step 116 may be an image difference comparison between the final solder product in a new soldering process and a associated final solder product information stored in the final product information database.

Figure 2:
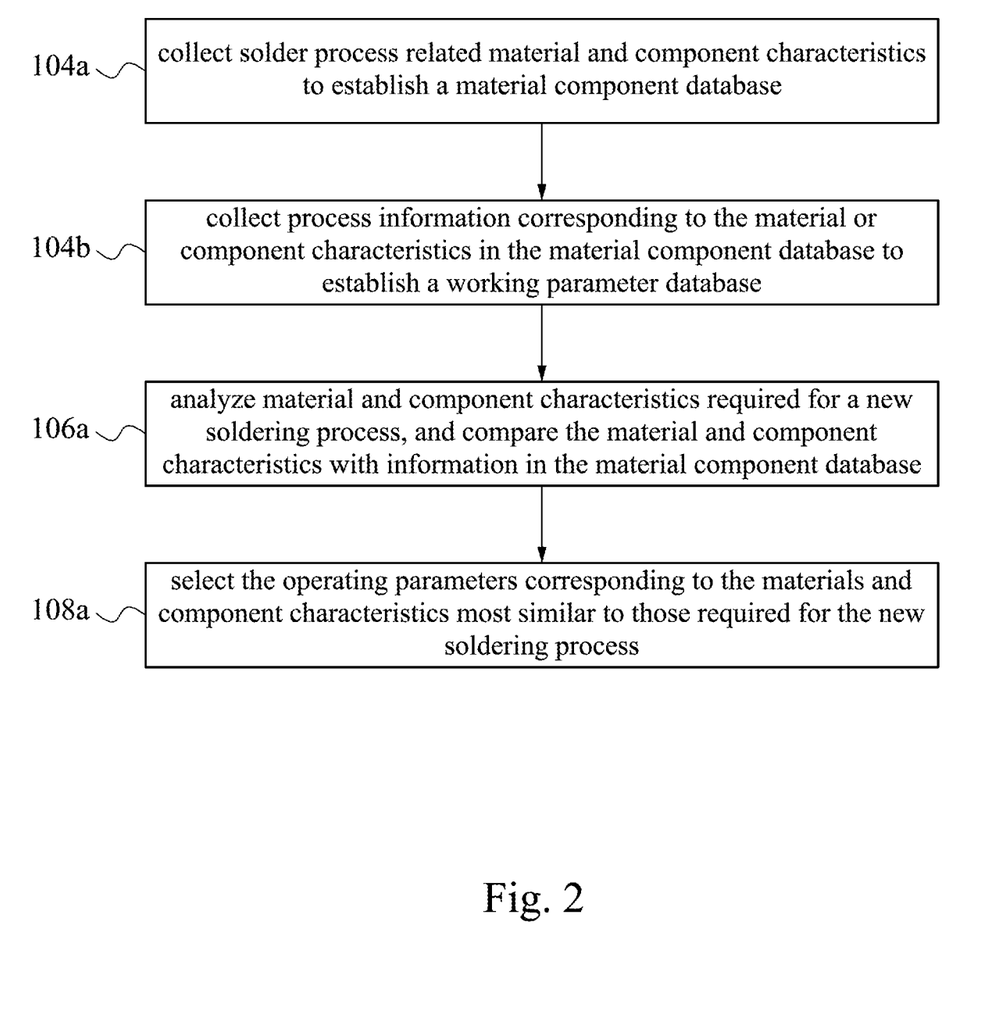
FIGS. 2 and 3 illustrate a soldering process parameters suggesting method according to another embodiment of the present disclosure.
Figure 3:
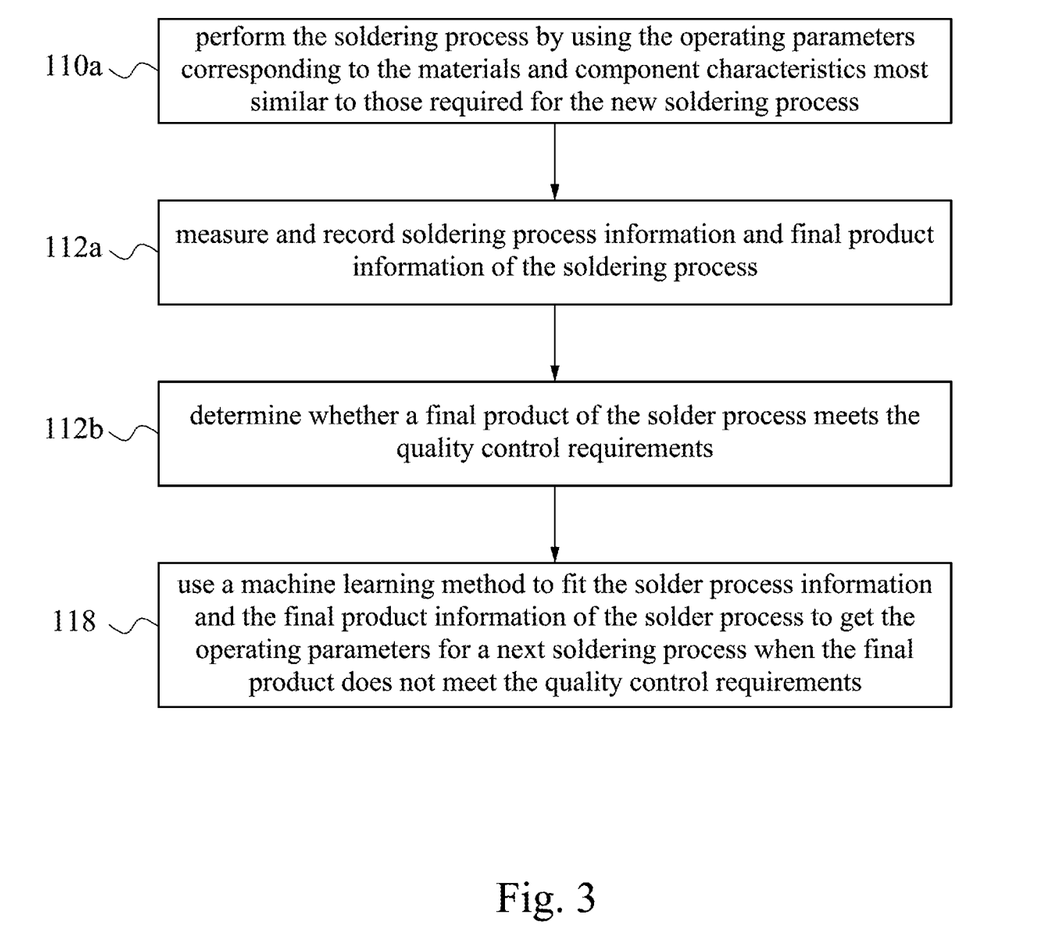

Please refer to FIGS. 2 and 3, which illustrate a soldering process parameters suggesting method according to another embodiment of the present disclosure. In steps 104a and 104b, solder process related material and component characteristics are collected to facilitate building a material component database, and the operating parameters corresponding to the material or component characteristics in the material component database is then collected to facilitate building a working parameter database.

In step 106a, when a new soldering process is proposed, material and component characteristics required for a new soldering process is analyzed and compared with information in the material component database built in step 104a, e.g., using correlation analysis and density clustering algorithms to select cases with similar characteristics.

In step 108a, operating parameters are selected in the working parameter database built in step 104b corresponding to the material and component characteristics most similar to those required for the new soldering process.

In step 110a, the soldering process is performed using the operating parameters selected in step 108a corresponding to the material and component characteristics most similar to those required for the new soldering process.

In step 112a, the soldering process execution information and the final product information of the soldering process generated in step 110a are measured and recorded.

In step 112b, verifying whether the final product information of the solder process recorded in step 112a meets the quality control requirements. The method for testing or verifying the final product of the solder process may be aforementioned ICT test, X-ray test, AOI test or solder structure micro-section inspection, etc. It should be noted that X-RAY test, AOI test, and solder structure micro-section inspection are image-inspection test, but the ICT tests are electrical tests to determine whether the solder structure is short-circuited, broken circuit or open circuit.

In step 118, when the final product information of the solder process recorded in step 112a does not meet the quality control requirements, the machine learning method is used to fit the soldering process execution information and the final product information of the soldering process recorded in step 110a to get the operating parameters for a next soldering process. In some embodiments, the recorded soldering process execution information and the final product information of the soldering process is input into the Bayesian optimization model to obtain new operating parameters for a next soldering process, i.e., using the new operating parameters to repeatedly perform steps 110a, 112a and 112b until the final product of the soldering process meets or passes the quality control requirements.

Figure 4:
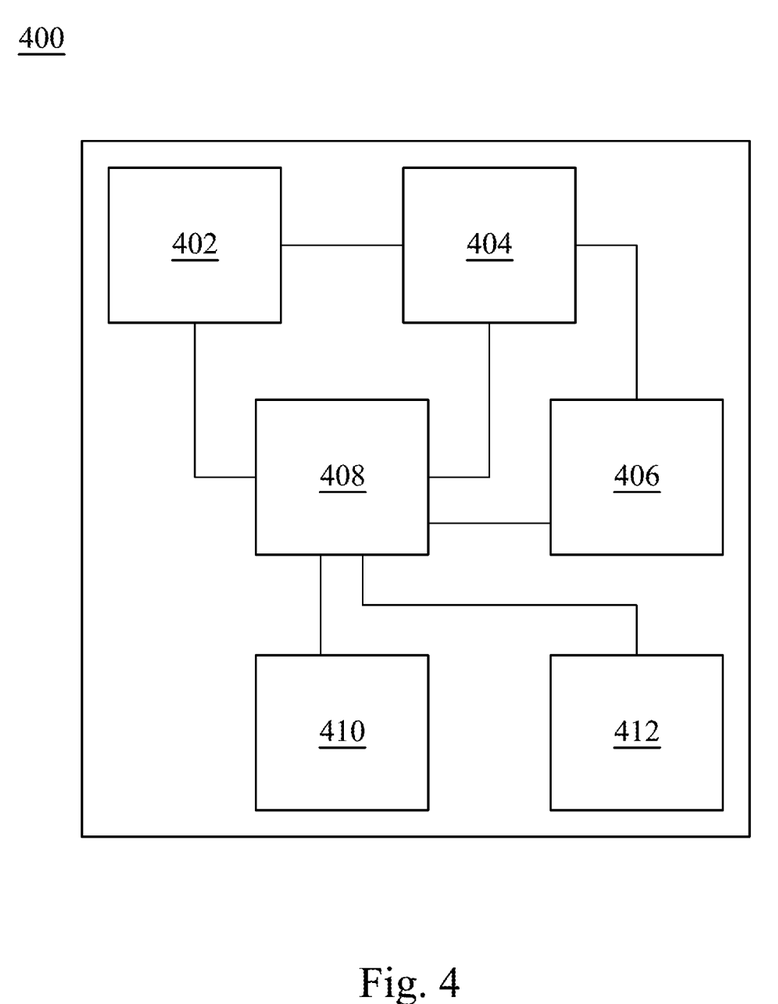
FIG. 4 illustrates a functional block diagram of a soldering process parameters suggesting system according to an embodiment of the present disclosure.

Please refer to FIG. 4, which illustrates a functional block diagram of a soldering process parameters suggesting system 400 according to an embodiment of the present disclosure. The system 400 includes a material component database 402, a working parameter database 404, a final product information database 406, a computing device 408, a soldering machine 410 and a detecting device 412. The material component database 402 includes storage devices, e.g., hard disk drives or solid state drives, and a processor, for collecting the first category information, e.g., solder process related material and component characteristics, e.g., processes in step 104a. The working parameter database 404 includes storage devices, e.g., hard disk drives or solid state drives, and a processor, for collecting the second category information, e.g., operating parameters corresponding to the material and component characteristics in the material component database 402, e.g., processes in step 104b. The computing device 108 includes storage devices, e.g., hard disk drives or solid state drives, and a central processor and/or graphics processor to perform steps, e.g., 106, 106a, 108, 108a, 110, 112, 112b, 114, 116, and 118. The soldering machine 410 includes various mechanical and electronical mechanisms necessary for performing solder process, e.g., in step 110a. The detecting device 412 includes various image sensors and/or temperature sensors for obtaining the third category information, i.e., measuring and recording soldering process execution information and final product information of the soldering process, e.g., in step 112a. The final product information database 406 includes storage devices, e.g., hard disk drives or solid state drives, and a processor, for storing the fourth category information or the solder quality result, i.e., the information of the final product of the soldering process, such as the solder structure inspection result of the final product, including the results of ICT test (In-Circuit-Test, ICT test), X-ray (X-RAY) test, AOI inspection (Automated Optical Inspection) or solder cross section inspection. All databases, devices and machines within the system 400 are interconnected to perform the steps in FIGS. 1-3.

When the soldering process parameter suggestion method is applied to a soldering production line equipped with a complete database system, the production line material information system may be connected to the soldering process parameter suggestion system as disclosed herein. After an intelligent calculation by the machine learning, the system will provide recommended operating parameters to the user, and a real-time recording of the actual solder condition can be feedback to a system adjustment calculation model during the testing process. This will automatically converge the optimal operating parameters, not only effectively shorten the parameter test time, but also completely record the solder production process. When the soldering process parameter suggestion method is applied to a soldering production line without a complete database system, a limited range of recommended operating parameters can be obtained for the limited production material information in the existing database, and the system test loop is entered to effectively converge the best operating parameters, and shorten the timeline for the production line that lacks a complete database system to move to automated production, and simultaneously establish the database system as well. When the soldering process parameter suggestion method is applied to a large-volume, small-variety production line, data accumulation can be quickly achieved to establish an optimal parameter model, thereby improving the production line efficiency. When the soldering process parameter suggestion method is applied to a small-volume, large-variety production line, the time to achieve stable production can be effectively shortened and test cost is thus reduced so as to lower the downtime for the production line.

In sum, the soldering process parameter suggesting method disclosed herein can be applied to a soldering production line with or without a complete database system as well as a production line for manufacturing large number of less varieties or small numbers of more varieties such that all kinds of soldering production lines can be improved effectively to achieve the automatic production.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A soldering process parameters suggesting method, comprising steps of:
  using at least a processor and a storage device to:
    collect solder process related material and component characteristics to establish a material component database;
    collect operating parameters corresponding to the material and component characteristics in the material component database to establish a working parameter database;
    collect soldering process execution information comprising at least solder temperature profiles, dynamic process images of solder feeding, and dynamic process images of solder heating to establish a soldering process information database; and
    collect solder quality results comprising at least image-inspection tests and electrical tests of solder structure final products to establish a final product information database, wherein the electrical tests are configured to determine whether the solder structure final products are short-circuited, broken circuit or open circuit;
  using a computing device to:
    execute a machine learning method to establish relationships between the soldering process execution information and the solder quality results so as to generate a quality prediction model;
    analyze material and component characteristics required for a new soldering process, and compare the material and component characteristics with information in the material component database; and use the quality prediction model to generate operating parameters corresponding to the material and component characteristics most similar to those required for the new soldering process;

using a soldering machine to perform the soldering process using the operating parameters corresponding to the material and component characteristics most similar to those required for the new soldering process;

using a detecting device including at least an image sensor and a temperature sensor to measure and record the soldering process execution information and final product information of the soldering process;

using the computing device further to:
determine whether a final product of the solder process meets quality control requirements; and
use the machine learning method to fit the soldering process execution information and the final product information of the solder process to get operating parameters for a next soldering process when the final product of the solder process does not meet the quality control requirements.

2. The soldering process parameters suggesting method of claim 1, further comprising a step of:
using the computing device further to assign operating parameters contained in the soldering process execution information as optimal operating parameters when the final product of the solder process meets the quality control requirements.

3. The soldering process parameters suggesting method of claim 1, further comprising a step of:
using the computing device further to repeatedly use the machine learning method to fit the soldering process execution information and the final product information of the solder process to get the operating parameters for a next soldering process when the final product of the solder process does not meet the quality control requirements.

4. The soldering process parameters suggesting method of claim 3, further comprising a step of:
using the computing device further to assign operating parameters contained in the soldering process execution information as optimal operating parameters when the final product of the solder process meets the quality control requirements.

5. The soldering process parameters suggesting method of claim 1, wherein the material component database comprises information on thermal properties, optical properties, and structural dimensions of solder process related materials and components.

6. The soldering process parameters suggesting method of claim 1, wherein the working parameter database comprises temperature parameters, laser spot parameters, and heating time parameters.

7. The soldering process parameters suggesting method of claim 1, wherein the machine learning method comprises:
using at least one or any combinations of decision tree algorithms, support vector machine algorithms, artificial neural network algorithms, and Bayesian algorithms to serve as dimensionality reduction algorithms.

8. The soldering process parameters suggesting method of claim 7, wherein the machine learning method further comprises:
using at least one or a combination of distance-based clustering and density-based clustering to perform cluster grouping.

9. The soldering process parameters suggesting method of claim 8, wherein the distance-based clustering comprises at least one or any combinations of K-means clustering, hierarchical clustering and Gaussian mixture model.

10. The soldering process parameters suggesting method of claim 8, wherein the density-based clustering comprises at least one or a combination of density-based spatial clustering of applications with noise and level set tree clustering.

11. The soldering process parameters suggesting method of claim 8, wherein the machine learning method comprises:
using at least one or a combination of a regression algorithm and a classification algorithm to establish a core of conditional probability calculations.

12. The soldering process parameters suggesting method of claim 11, wherein the regression algorithm comprises at least one or any combinations of generalized linear model algorithms, support vector machine algorithms, decision tree algorithms, random forest algorithms, gradient boosting machine algorithms, and neural network algorithms.

13. The soldering process parameters suggesting method of claim 11, wherein the classification algorithm comprises at least one or any combinations of generalized linear model algorithms, support vector machine algorithms, decision tree algorithms, random forest algorithms, gradient boosting machine algorithms, and neural network algorithms.

14. A soldering process parameters suggesting system, comprising:
a material component database including at least a first processor and a first storage device and configured to collect solder process related material and component characteristics;
a working parameter database including at least a second processor and a second storage device and configured to collect operating parameters corresponding to the material and component characteristics in the material component database;
a soldering process information database including at least a third processor and a third storage device and configured to collect soldering process execution information comprising at least solder temperature profiles, dynamic process images of solder feeding, and dynamic process images of solder heating;
a final product information database including at least a fourth processor and a fourth storage device and configured to collect solder quality results comprising at least image-inspection tests and electrical tests of solder structure final products, wherein the electrical tests are configured to determine whether the solder structure final products are short-circuited, broken circuit or open circuit;
a computing device configured to:
execute a machine learning method to establish relationships between the soldering process execution information and the solder quality results so as to generate a quality prediction model;
analyze material and component characteristics required for a new soldering process, and compare the material and component characteristics with information in the material component database; and
use the quality prediction model to generate operating parameters corresponding to the material and component characteristics most similar to those required for the new soldering process;
a soldering machine configured to perform a soldering process using the operating parameters corresponding to the material and component characteristics most similar to those required for the new soldering process; and a detecting device including at least an image sensor and a temperature sensor and configured to measure and record the soldering process execution information and final product information of the soldering process, wherein the computing device is further configured to:
   determine whether a final product of the solder process meets quality control requirements; and
   use the machine learning method to fit the soldering process execution information and the final product information of the solder process to get operating parameters for a next soldering process when the final product of the solder process does not meet the quality control requirements.

15. The soldering process parameters suggesting system of claim 14, wherein the material component database comprises information on thermal properties, optical properties, and structural dimensions of solder process related materials and components.

16. The soldering process parameters suggesting system of claim 14, wherein the working parameter database comprises temperature parameters, laser spot parameters, and heating time parameters.

17. The soldering process parameters suggesting system of claim 14, wherein the machine learning method is at least one or any combinations of decision tree algorithms, support vector machine algorithms, artificial neural network algorithms, and Bayesian algorithms to serve as dimensionality reduction algorithms.

* * * * *